United States Patent [19]

Thorne et al.

[11] Patent Number: 4,767,334
[45] Date of Patent: Aug. 30, 1988

[54] EDUCATIONAL AND RECREATIONAL TOY VEHICLE

[76] Inventors: Hugh C. Thorne, Box 22843 U. P. R. Sta., San Juan, P.R. 00931; Guillermo Sosa, 1890 Fco. Quindos St., Fairview, Rio Piedras, P.R. 00926; José F. Irizarry, Box 1267, Mayaguez, P.R. 00709

[21] Appl. No.: 799,485
[22] Filed: Nov. 19, 1985
[51] Int. Cl.$^4$ .............................................. A63C 31/16
[52] U.S. Cl. ......................................... 434/29; 434/38; 434/43; 446/7; 446/94; 272/17
[58] Field of Search ............................. 434/29, 38, 43; 272/16–18; 446/7, 94, 95

[56] References Cited

U.S. PATENT DOCUMENTS

| | | | |
|---|---|---|---|
| 3,173,686 | 3/1965 | Rettie et al. | 272/17 |
| 3,618,256 | 11/1971 | Monks | 446/7 |
| 3,826,250 | 7/1974 | Adams | 272/18 |
| 4,461,470 | 7/1984 | Astroth | 434/43 |
| 4,478,407 | 10/1984 | Manabe | 434/43 |
| 4,492,372 | 1/1985 | Lorence et al. | 272/17 |

*Primary Examiner*—Leo P. Picard
*Attorney, Agent, or Firm*—Beveridge, DeGrandi & Weilacher

[57] ABSTRACT

A fully enclosed toy craft intended for both amusement and educational purposes having the ability to assume a multitude of forms with each form resembling a different type of vehicle. The craft's interior resembles a scaled down version of a commander's cabin in a real craft and includes, among other things, audio visual material, calculating apparatus, and an assortment of readout or instrumentation devices. In addition, an analog computer interacting with various items in the commander's cabin, in response to stimuli provided by the operator moving hand or foot control devices gives the operator the illusion of being in control of a real craft.

10 Claims, 13 Drawing Sheets

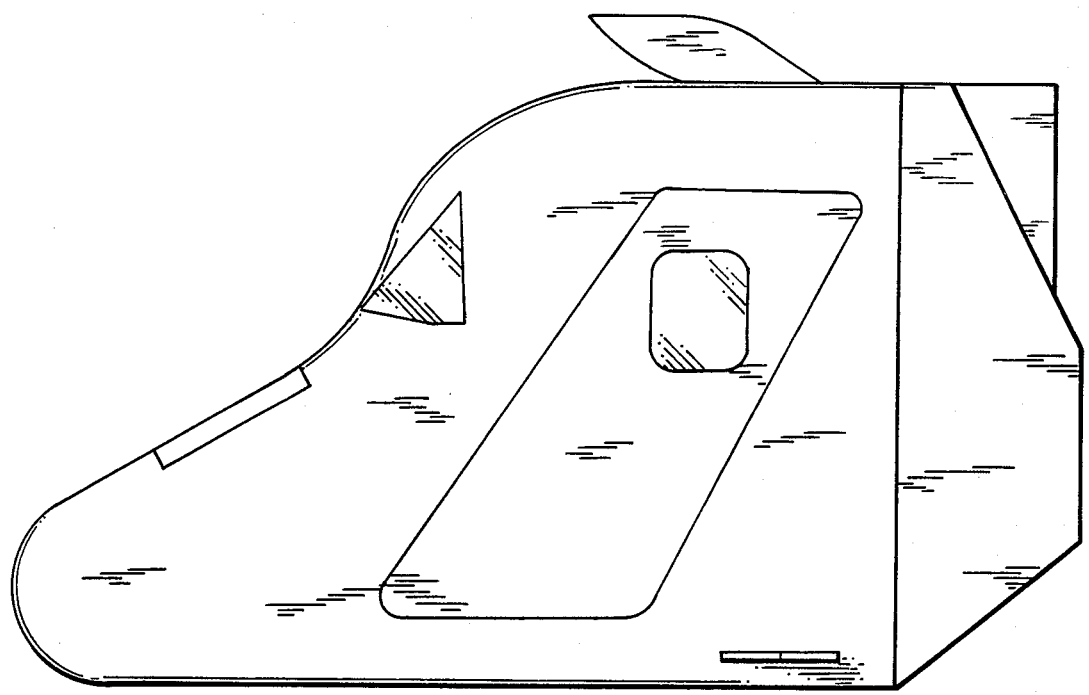
FIG. I
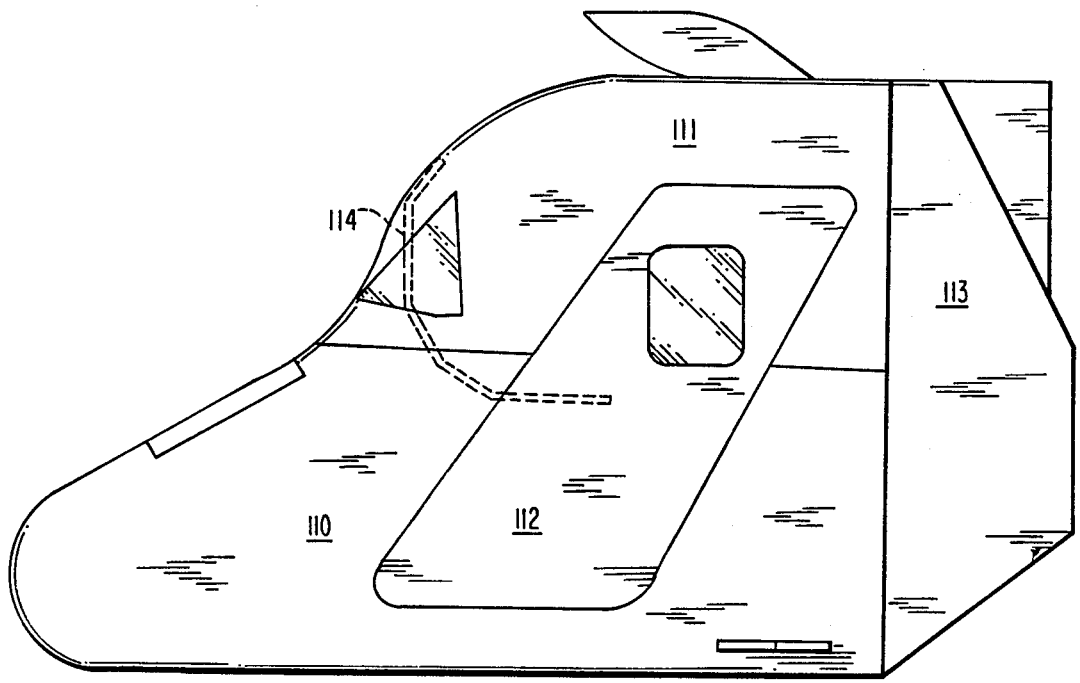
FIG. II

ANALOG COMPUTER VERSION

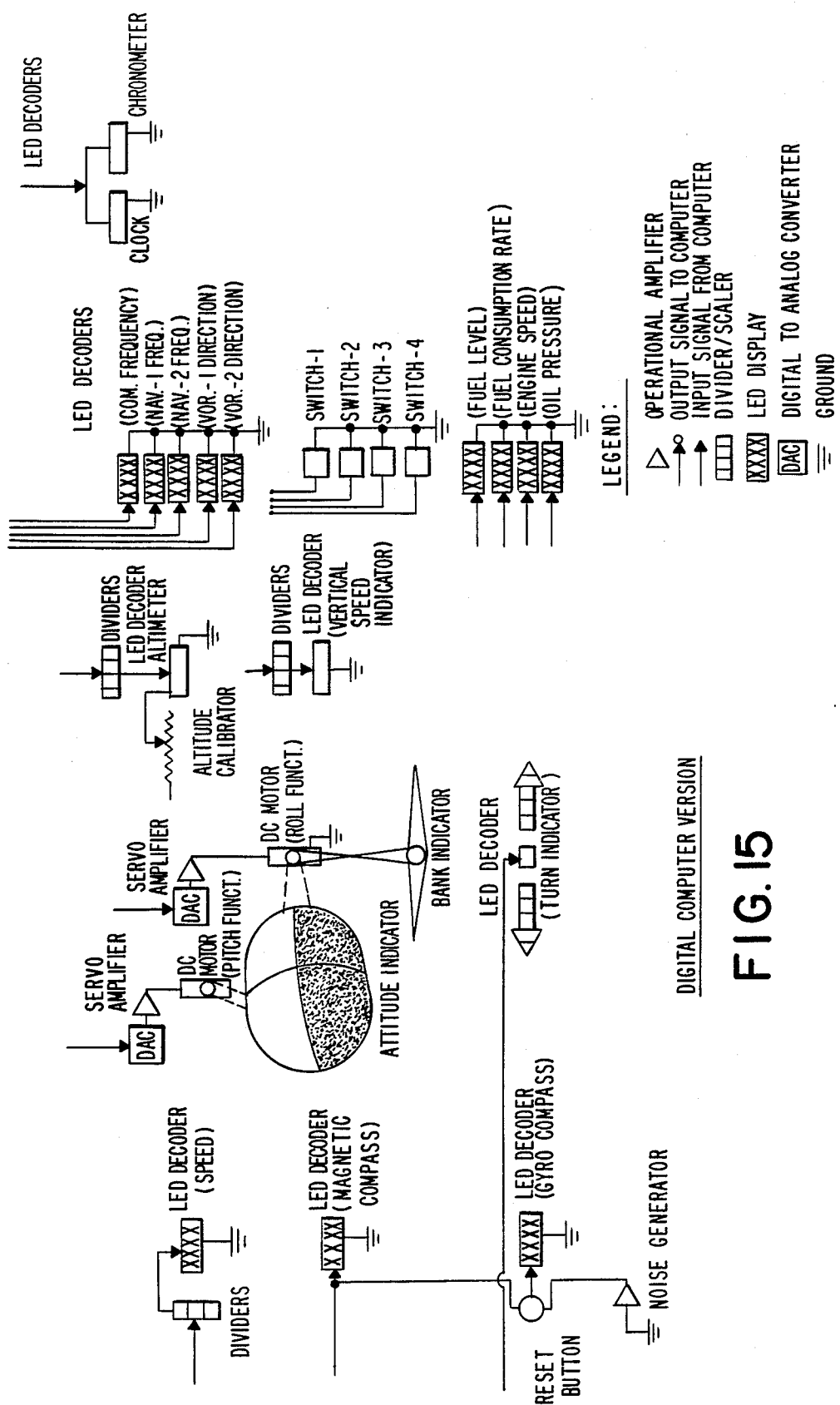

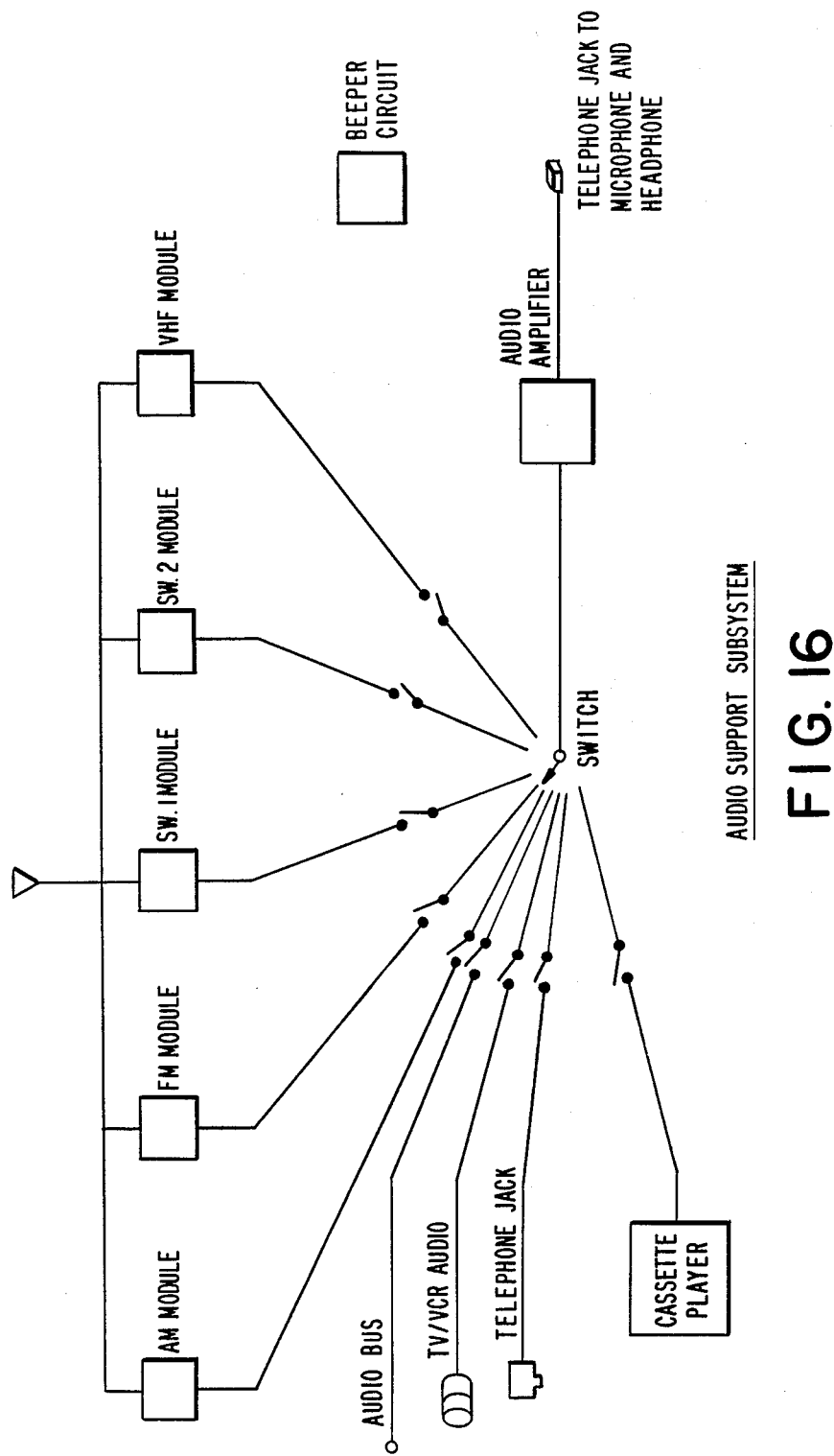

EDUCATIONAL AND RECREATIONAL TOY VEHICLE

BACKGROUND OF THE INVENTION

Toy consoles simulating a vehicle have been developed before. In some cases the child sits in a contraption that is a representation of the vehicle being simulated, with part of the body enclosed in a structure representative of said vehicle. A typical example of this type of device is illustrated in U.S. Pat. No. 2,684,243 to Alston dated July 20, 1954.

Other inventions have been developed in which a small model airplane is mounted upon a housing for various manipulations using a joystick or control wheel, as well as foot-operated pedals or crossbars such as a rudder bar. Typical examples of these are found in U.S. Pat. Nos. 2,526,371 to Laughead et al, dated Oct. 17, 1950 and 3,534,486 to Frasca, dated Oct. 20, 1970.

Various other types of airplane-type toys principally representing consoles and/or instrument panels of an airplane have been developed for purposes of amusement or instruction, typical examples of such devices being found in U.S. Pat. Nos. 2,454,693 to Foster, dated Nov. 23, 1948; 3,060,598 to Gilbert et al, dated Oct. 30, 1962; 3,978,609 to English, dated Sept. 7, 1976; and 4,269,596 to D'Andrade, dated May 26, 1981.

Toy console simulating vehicles developed heretofore have used electric motors, links or cables and various types of mechanical devices to produce the desired indicators of attitudinal change. All of the inventions cited above are of this type. Our invention uses state-of-the-art digital and analog electronic technology specifically for the purpose of improving and extending the realism of water, land, air and space toy vehicle operating environments. The invention combines a fully enclosed craft-commander's cabin, with modularized, replaceable and upgradeable working instrumentation, and coordinated audiovisual materials designed for both amusement and instruction. This represents a substantial improvement over related toys invented before or being marketed today.

SUMMARY OF THE INVENTION

Our invention relates to children's toys. Particularly, the invention has to do with the type of toy known as "educational" or having the capacity to help the child acquire knowledge or dexterity. It is a toy that provides a novel application of the concept of an integrated motivational, educational and entertainment medium for children with widely varying areas of interest and levels of intellectual sophistication.

The toy is a complete enclosure with access door, providing the child with a full array of operational instruments mostly under analog/digital computer control. These instruments, together with related equipment and audio-visual educational games, represent a powerful attraction to the young person's curiosity, both stimulating his or her imagination and creating a desire for learning. Our invention is intended to challenge the imagination of children that, because of exposure to television, arcade games and other stimuli, are bored by conventional toys, but more importantly, by the conventional teaching methods found in most schools today. The child will be able to pursue those very same fantasies stimulated by television and cinema in a safe manner while using equipment and instrumentation that guide him through a multiplicity of learning experiences. The "games" the child will play are the delivery medium through which a series of coordinated lessons in subjects of increasing levels of complexity are covered. These are designed to complement school materials for difficult to teach concepts in subject areas such as earth sciences, mathematics, aeronautics and astronautics. They are all related to the task of "commanding" a craft through processes such as pre-flight checkout, take-off, craft navigation, situations encountered while in flight and landing. To cater to the child's particular fancy, the vehicle is flexible enough to be easily modified into small size versions of spaceships, airplanes, submarines, tanks and related craft. For each version, the child will be able to operate working instruments whose degree of complexity may be varied according to his/her age, tastes and abilities.

There is nothing in previous inventions that comes even near to our invention of a fully enclosed vehicle with operational instruments and a built-in educational process effective in handling difficult to teach subject matters.

The main purposes of this toy invented by us are the following:

1. To provide a functional and physical representation of a vehicle with related instrumentation, equipment and audio-visuals designed to afford the total experience of being the person in command of a craft.

2. To provide a multipurpose design, flexible enough to represent a variety of vehicles—spacecraft, airplane, submarine, land explorer, or any related craft, with corresponding internal instrumentation and equipment but requiring only minor modifications to the exterior shell itself.

3. To enhance the realism of the craft by providing a complete enclosure, with access door, and built of a size to allow unencumbered entrance by a child and conveying the feeling of isolation from the surrounding environment.

4. To equip the toy with operational instruments, gadgets and equipment devised to give pleasure, but more importantly, education on subjects basic to the intellectual development of a child or young adult in a technological society.

5. To provide integrated simulations and experiments in the form of "experience packages" of our invention that include the necessary equipment, descriptive literature and audio-visual material which are the media through which the fantasy is created. As an example, a cassette recording coupled with color transparencies and the appropriate instruments can create the illusion of a pre-departure checkout process and craft take-off, while at the same time providing a wealth of information to the child in areas as diverse as radio communications, propulsion, hydraulics, navigation and atmospherics. Game units to help learn about geography, astronomy, space travel, information sciences, telecommunications, oceanography, and other areas of knowledge are part of the invention.

6. To limit the toy's obsolescense by including the capacity to provide increasingly sophisticated learning experiences as the intellectual needs of the individual mature. This is attained by clustering the craft instrumentation into modular panels to which new instruments can be added. The panels themselves can be replaced partially or entirely to yield new learn-while-you-play situations. These "situations" are designed to relate logically while progressively increasing in level of difficulty and subtlety.

Other purposes of our invention which are ancillary to those previously discussed are:

7. To place an adjustable seat within an aerodynamically designed lightweight enclosure of a size that will entirely contain a child or young adult, with an operational access door, a periscope-like optical instrument on the roof and several windows that afford the occupant a view towards the outside of the craft. Several portholes in strategic locations provide adequate natural ventilation. To the rear of the enclosure there is placed behind the adjustable seat an electronic power supply of the type that provides various levels of low voltage on the secondary winding, and an electric extractor fan of the type whose speed is controlled by a rheostat.

8. To place within easy reach of the child, in an ergonomically designed layout, various clusters of functioning electronic instruments and control devices, grouped on several panels by virtue of their likeness in function and purpose, there being one panel comprising electrical power control devices, one panel comprising a video display device, one panel comprising vehicular control instruments, one panel comprising a computer, one panel comprising environmental monitoring devices and low voltage electrical outlets and one panel comprising audio devices.

9. To mold into the edge of each panel a number of metal or plastic studs that provide the means of attaching said panels to the interior of the enclosure in such a way that they may be removed and replaced without the need of tools. There is also molded into the rear of each panel a set of solid electrical connecting pins, each of which, by having a predefined shape and location, automatically plugs into the appropriate low voltage electrical power or control circuit, providing for modularity in the installation and replacement of the instruments.

10. To place an analog computer in one of the panels so that by manipulating a joystick, throttle lever and rudder pedals, the occupant produces changes in the position of the attitudinal instruments such as the artificial horizon, bank indicator and turn indicator and the electronic readout instruments representing the altimeter, magnetic compass, knotmeter and rate of climb indicator.

11. To obtain more realistic instrument behavior by replacing the analog computer with a digital processor which, when used with the appropriate computer program and coupled with a computer video monitor, also provides a simulated view to the exterior of the craft.

12. To provide a digital calculator for the application of numerical algorithms to solve various problems and partake in various exercises afforded the occupant by the computer software or by written material which, in conjunction with a flat surface running across the interior width of the enclosure which functions as a work/study table, propitiates a stimulating environment for the study of various subjects related to the arts and sciences.

13. To group in a device of our invention a set of audio instruments including cassette player, AM radio, FM radio, short wave radio, VCR jack, telephone jack and external intercom jack onto a panel, providing a means of removing and replacing at will any of the radio modules, each of which being a combination radio frequency tuner and demodulator designed so that all modules output their signals through a common audio frequency amplifier.

14. To provide a periscope-like external vision apparatus (EVA) of our invention. The EVA will greatly enhance the educational and recreational capabilities of the toy since, by placing a TV set near the unit, the child may experience a wide range of additional learning and entertainment situations. One of the options provided consists of microcomputer-based lessons and games that the child can activate by means of an internally-mounted joystick, while maintaining visual contact with the television monitor through the EVA. In this way, the child may experience the illusion of performing the duties of a craft commander in the realm of his or her very personal space, while indirectly but very effectively acquiring important new knowledge. We have found that looking at an outside TV screen through the periscope-like EVA adds substantially to the fantasy-creating capabilities of the craft. The child can also use the EVA to watch his favorite TV programs.

15. To provide an intercom so that parents, teachers and friends can communicate with the child inside without destroying the illusion of the craft. The child will have a headset and the vehicle will be supplied with an external jack in which a handset can be plugged so as to orally communicate with him or her.

16. To provide a switch panel from where the electricity to all other panels can be individually controlled.

17. To provide a photovoltaic cell/light pen combo located next to the craft access door so that the child can reach in the dark for the light pen and by pointing it to the photovoltaic cell automatically turn on the craft's instrument panel lights.

18. To provide all the educational material in various languages, including English, Spanish, French, Italian, German and Japanese. This versatility permits the use of our invention as another learning tool by those in need of mastering a foreign language.

19. To allow for the possibility that the rear portion of the vehicle may be detached and a second module inserted, so that another child can participate as a navigator or co-pilot and have an active part in the learning experience. Some learning packages will provide interaction between two or more children.

DESCRIPTION OF DRAWINGS

FIG. 1 is a left side elevational view of the invention, the right side being substantially a mirror image thereof.

FIG. 11 is a left side elevational view depicting the major components that would be molded separately and brought together for assembly.

FIG. 15 is a simplified diagram of the Digital Computer Control System.

FIG. 16 is a simplified diagram of the Audio Support System.

DETAILED DESCRIPTION

Figure 2:
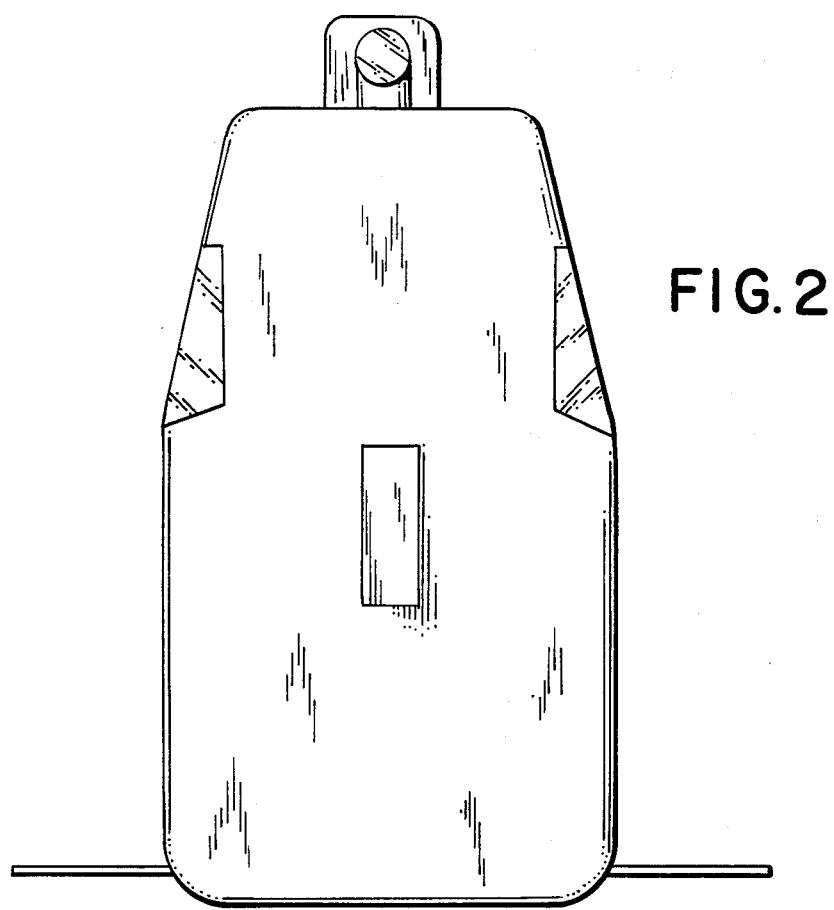
FIG. 2 is a front elevational view.
Figure 3:
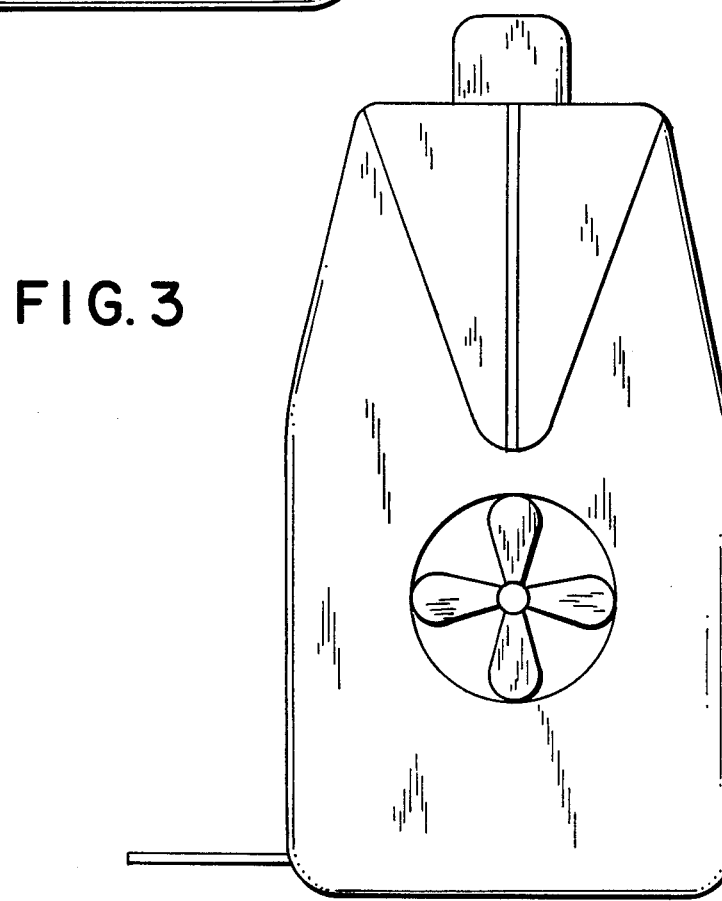
FIG. 3 is a rear elevational view.
Figure 4:
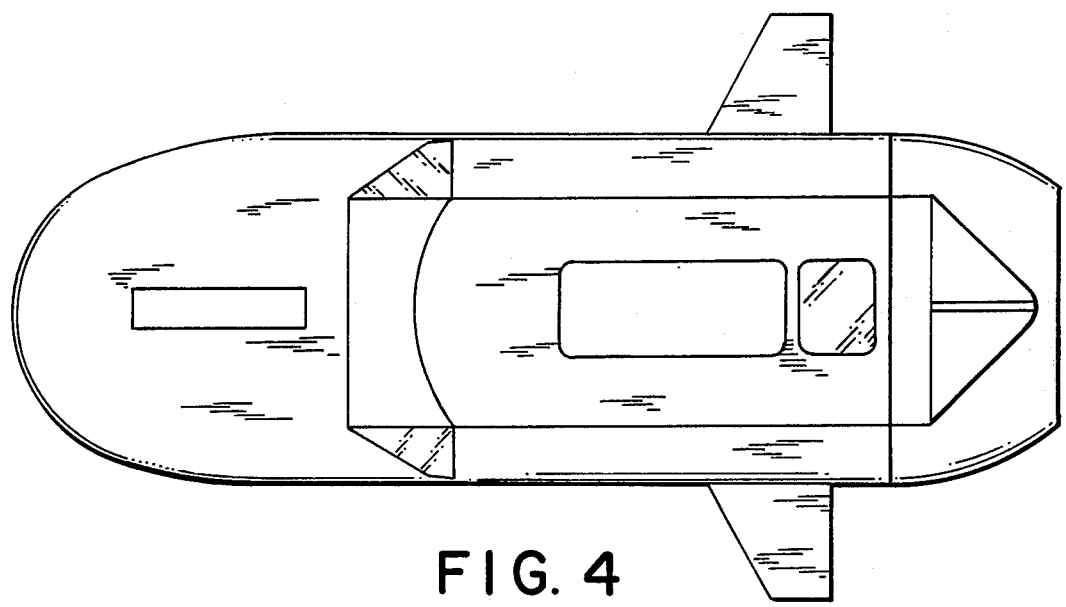
FIG. 4 is a top plan view.
Figure 5:
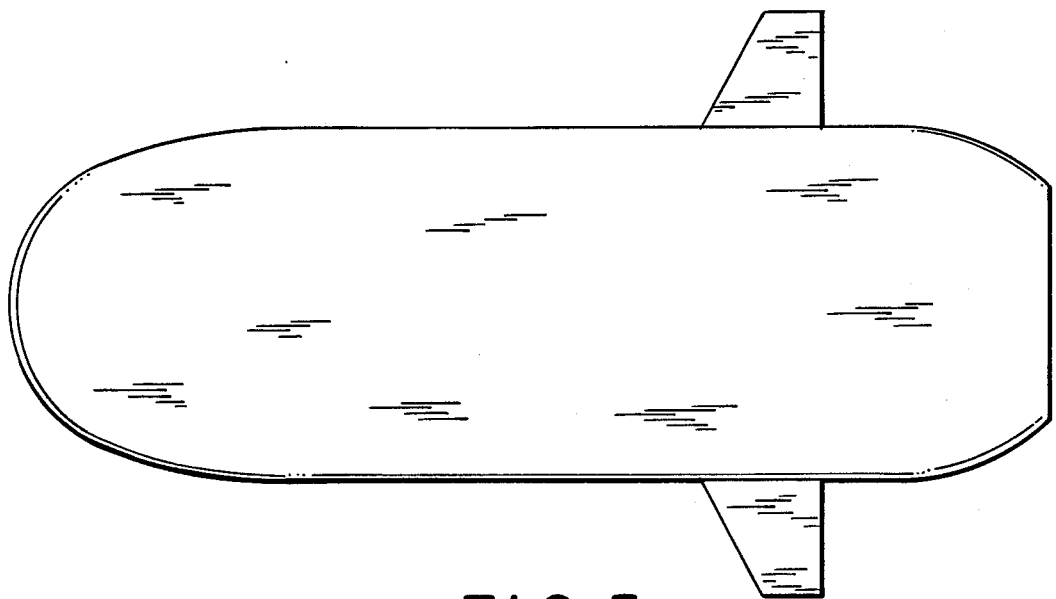
FIG. 5 is a bottom plan view.

While our invention can be modified into myriad alternative configurations, an illustrative embodiment is shown in the drawings that are part of this description, and will hereinafter be defined in detail. The illustrations incorporate all the instrumentation to which we lay claim, and demonstrates the craft's capacity for both external and internal reconfiguration.

The present invention comprises a closed capsule resembling a vehicle inside which a person can be enclosed and contained entirely for purposes of simulating on a computer screen the movement of the vehicle in the medium it would normally use, such as climbing, descent and left and right bank in the case of a spacecraft or airplane. The capsule is designed for amusement and for the extensive education of persons, children in particular, who, in operating the craft manipulate certain simulated mechanisms found in full-scale vehicles, such as joystick and throttle levers while reading the instruments on the display panel and receiving instruction and information through various audio devices. Particularly for purposes of minimizing the cost of manufacturing and assemblying the various components into a finished product, most components are molded from rigid type plastic material, with some of the components being appropriately colored to distinguish them where desirable. Various types of gauges and indicators are included on the instrument panels, as well as a microcomputer, a keyboard, computer monitor, calculator, switches, radios and cassette player to render the operation of the machine more realistic and meaningful.

Some features of the present invention have been adapted from full scale operational devices. In adapting these devices to a relatively small, child-sized model of a vehicle, substantial improvements have been made resulting in a totally different application of the prior art. This, complimented by the many features invented by us, produces a totally revolutionary educational toy. The following is a detailed description of the invention.

FIGS. 1 through 5 depict the exterior characteristics of our invention. It is a multipurpose design flexible enough to represent a wide variety of vehicles with only minor cosmetic modifications to the shell. The design is original in the following aspects:

a. Cocoon-like, full enclosure, complete with access door to convey the feeling of being in a "protected space", shielded from the outside world.

b. Shape of its door to enable easy entrance even by partially handicapped children.

c. Combined natural and forced-air ventilation systems that provide adequate airflow without detracting from the feeling of encloseness.

d. Window layout that brings in light and enables parents to supervise child without affecting the illusion of privacy and enclosedness.

e. Ease with which a tandem module can be added for a second child to enact the role of co-pilot or navigator.

f. The physical shape and size, which have been designed taking into consideration the modern realities of reduced-space living.

Figure 6:
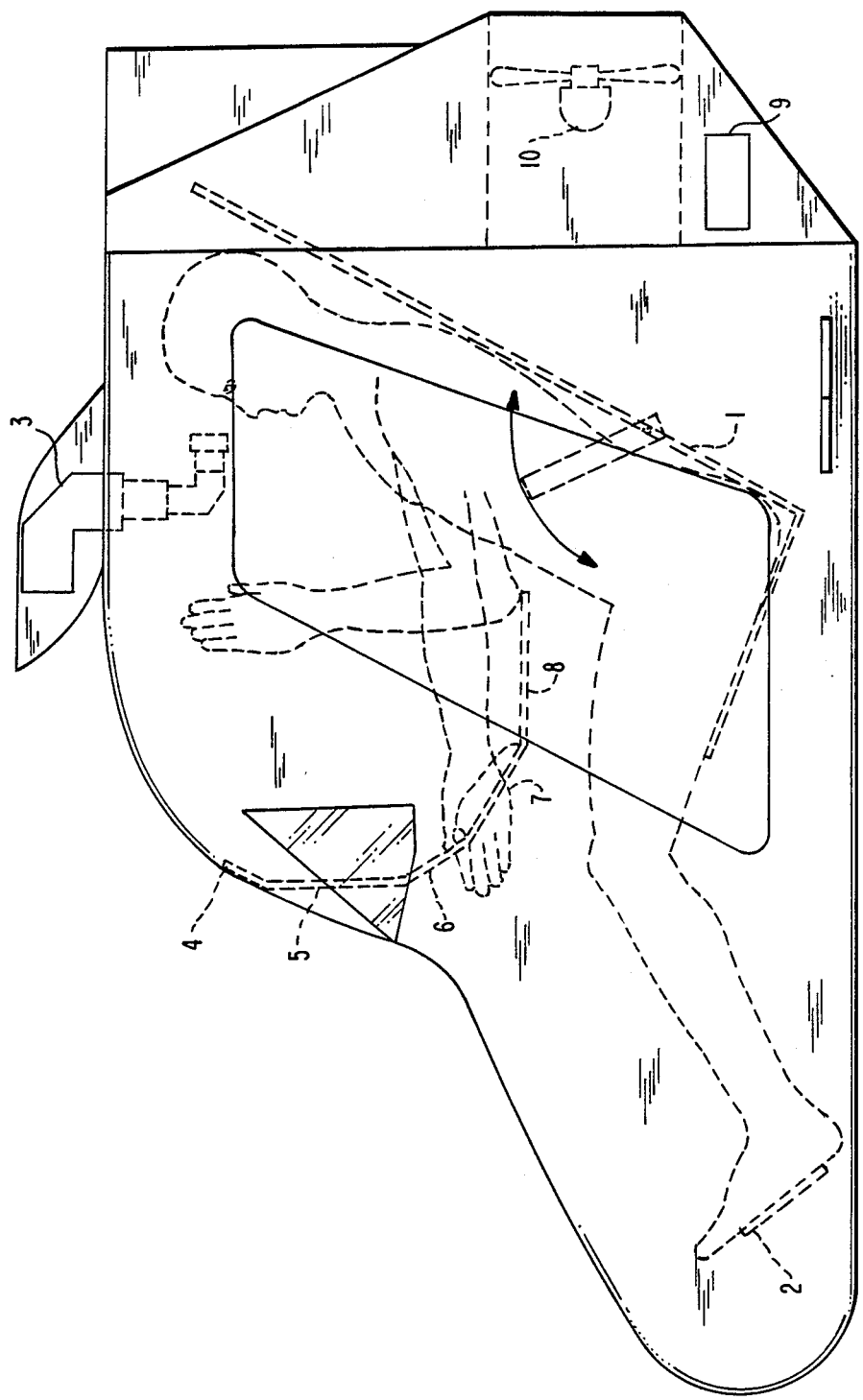
FIG. 6 is a left side elevational view showing the position of the child and the relative inclination of the main instrument panels.

FIG. 6 is an illustration of our invention, depicting an occupant sitting in a semi-reclining chair (1) that can slide back and forth to adjust to any size individual, with feet placed on foot pedals (2) which are also adjustable, along a track in the floor. The occupant is afforded an outside view via an External Vision Apparatus (EVA) (3) similar to a periscope, and controls the simulated movements of the craft by using the pedals and levers provided, while referring to instrument panels.

The main console comprises a switch panel (4), a computer monitor or backlighted transparency display panel (5), an instrument panel (6) and a computer/keyboard panel (7). A sliding work/study table (8) provides a surface upon which reading material or work papers can be placed. Electric power in the craft is supplied by an isolated power converter (9) which delivers various voltage levels to the required locations on the panels, and also provides power to the controls for the exhaust fan (10) located in the rear of the craft.

Figure 7:
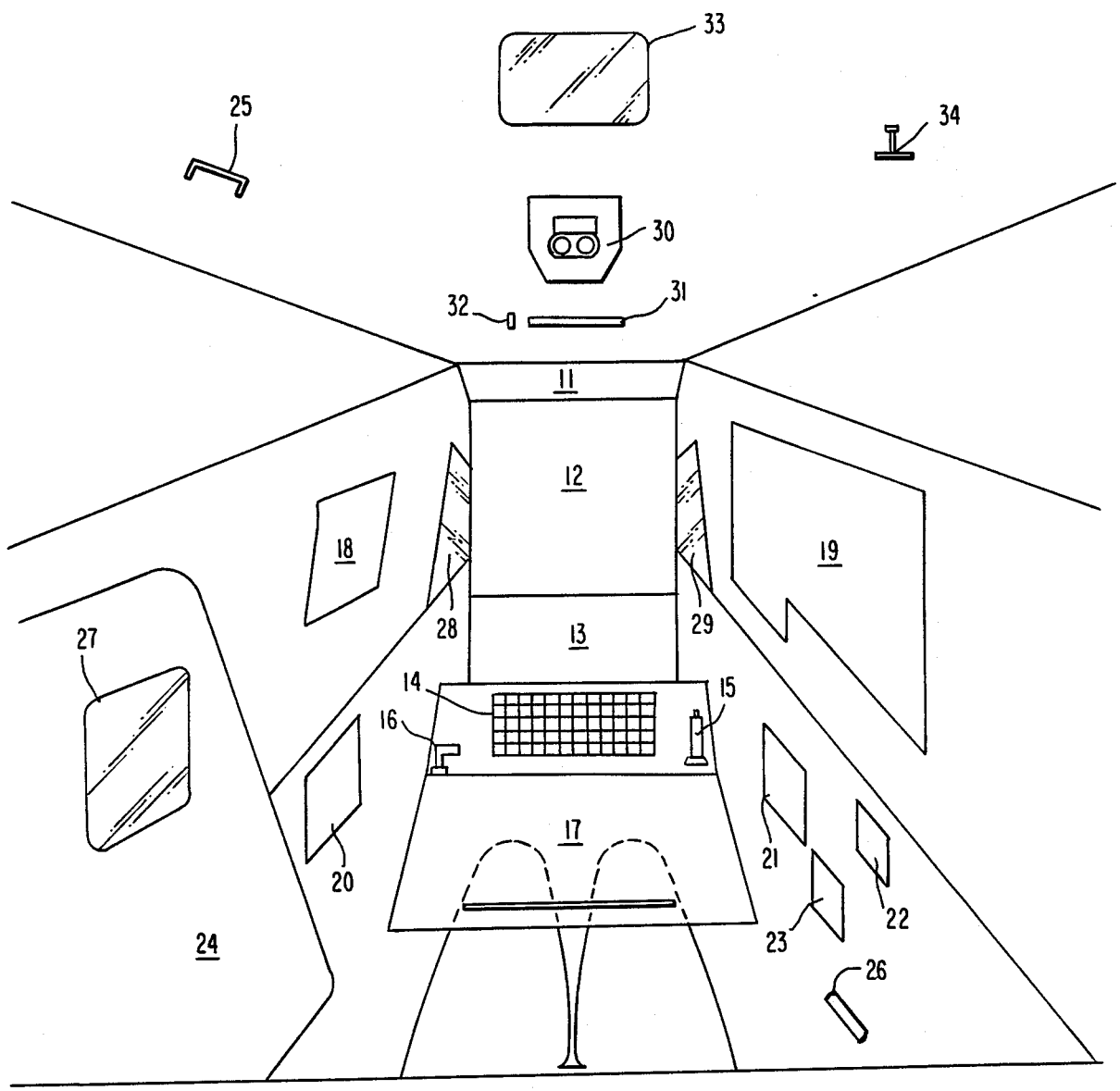
FIG. 7 is a slightly enlarged perspective view of the interior of the vehicle looking forward from the operator's position.

In FIG. 7, which is a forward looking vertical perspective view, it can be seen that the operator faces the switch panel (11), the computer monitor or backlighted transparency display unit (12), the instrument panel (13), the computer/keyboard panel (14), with joystick (15) and throttle lever (16) and the sliding work/study table (17). On the sides, there are secondary panels, one of which comprises environment monitoring instruments (18) while another comprises the audio support system (19). Panels (20), (21), (22) and (23) are provided for the installation of modular experimentation instruments and educational toys such as, but not limited to, remote control units, robot arm controls, simulated laser gun controls, morse code keypad, computer communications modem, nickel-cadmium battery charger and telephone keypad. Access to the machine is gained through a door on the left side (24) using the optional handgrips (25) and (26). The operator has an outside view by way of a sliding window (27), the tinted plastic windows (28) and (29), or the External Vision Apparatus (30) which rotates around its base to face any direction, slides back and forth to accomodate various sizes and shapes of occupant, and collapses both vertically and horizontally. Additional lighting is provided by the fluorescent cockpit lamp (31), controlled by switch (32), and tinted hatch (33) which may be replaced by other educational instruments. The rheostat lever (34) controls the speed of the extractor unit to alter the rate at which the air inside the cockpit is exchanged, while also giving the occupant an added sense of control over the vehicle.

THE SWITCH PANEL

Figure 8:
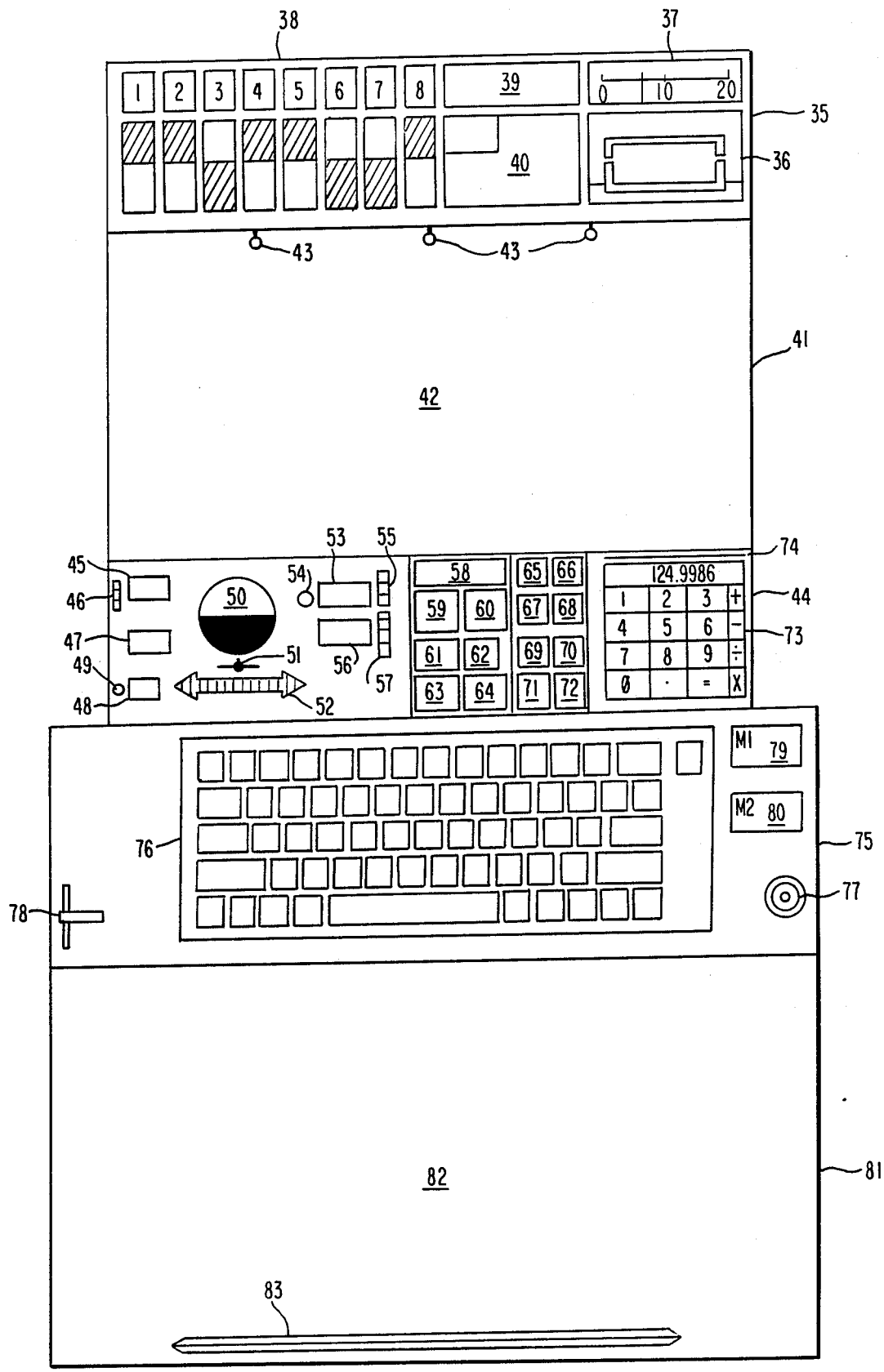
FIG. 8 is an enlarged elevational view of the main panels.

Referring to FIG. 8, the overhead switch panel (35) comprises a main switch (36) with an ampmeter (37), a cluster of rocker switches with their associated numbered monitor lights (38) to indicate an active state, the operator's name tag (39) and a flag decal (40).

THE COMPUTER MONITOR/BACKLIGHTED TRANSPARENCY DISPLAY PANEL

In FIG. 8, the computer monitor/backlighted transparency display panel (41), occupies an area directly in front of the operator, so that all educational games adaptable to display may be easily viewed. If the computer monitor option is used, its location provides the sensation of looking outside the vehicle with the aid of TV cameras and other similar electronic devices. If a backlighted transparency display unit is used instead, its face (42), would provide enought light to show the details on large color transparencies specially designed to illustrate various themes in, the earth and space sciences and other subjects. The transparencies will be held in place by rubber tipped metal clips (43), which can be manipulated by a small child.

THE INSTRUMENT PANEL

Referring to FIG. 8, it will be seen that the instrument panel (44), in the spacecraft or aircraft versions contains several computer controlled instruments such as:

A LED (45), displaying simulated speed values in knots, km/hr, ft/sec or mach numbers as determined by selecting one of the labelled pushbutton switches (46);

A computer-controlled LED (47), displaying the simulated magnetic compass heading;

A computer-controlled LED (48), displaying the simulated gyro compass heading which will appear to be reset after precession has occurred by pressing pushbutton switch (49);

A computer-controlled artificial horizon (50), consisting of a plastic face card whose orientation is controlled by servo motors that assume particular axial deviations determined by input voltage signals;

A computer-controlled simulated bank indicator (51), which is similarly controlled by a servo motor;

A computer-controlled simulated turn indicator (52), consisting of LEDs that are energized progressively in proportion to the speed of the simulated turn;

A computer-controlled simulated digital altimeter (53), consisting of a LED whose displayed values will appear to be calibrated for changes in atmospheric pressure by manipulating a rheostat (54), and whose display units may be feet, meters, miles or kilometers as determined by selection of one of the labelled pushbutton switches (55);

A computer-controlled simulated vertical speed indicator (56), consisting of a LED whose displayed values are determined to be ft/sec, meter/sec or other appropriate units by selecting one of the labelled pushbutton switches (57).

Several simulated radio and navigation instruments are provided in the form of LEDs (58), (59), (60), (61), (62), (63) and (64) which represent the communications radio frequencies, navigation radio frequencies, VOR direction readouts, clock and chronometer. However, these will represent different instruments in other vehicles, for example, turbidity meter, and salinity for an undersea vehicle.

A group of lighted pushbutton switches (65), (66), (67) and (68) are provided to represent the raising and lowering of landing gear, the extension and retraction of wings, the turning on and off of running lights or wing de-icers, etc. An additional group of LEDs (69), (70), (71) and (72) is used to display simulated fuel level, fuel consumption rate, engine speed and oil pressure.

A digital calculator (73), connected to the craft's electrical power supply is provided along with a slide rule (74), that provides factors for converting between units such as feet, meters, microns, and angstroms or between Farenheit, Rankine, Celsius and Kelvin degrees.

THE COMPUTER KEYBOARD PANEL

Referring again to FIG. 8, the computer keyboard panel (75), comprises a computer keyboard (76), a joystick (77), and throttle lever (78), which produce input signals to the particular program in use generating in turn a response that is observable on the monitor (42), and on the various digital and analog instruments on the instrument panel (44) described above. The programs themselves, or parts thereof, may be contained in ROM (Read Only Memory) cartridges that would be inserted in cartridge readers (79) and (80).

THE SLIDING WORK/STUDY TABLE

Referring again to FIGS. 7 and 8, the work/study table (81), comprises a sturdy plastic element that provides a flat surface (82), that runs the entire width of the cockpit and contains a groove (83), to prevent pencils and other objects from rolling off, and which can be pushed forward under the keyboard panel (75) until it is completely hidden from view.

THE ENVIRONMENT MONITORING AND CONVENIENCE PANEL

Referring now to FIG. 7, the Environment Monitoring and Convenience Panel (18) comprises digital weather instruments, a photovoltaic cell and several low-voltage outlets.

Figure 9:
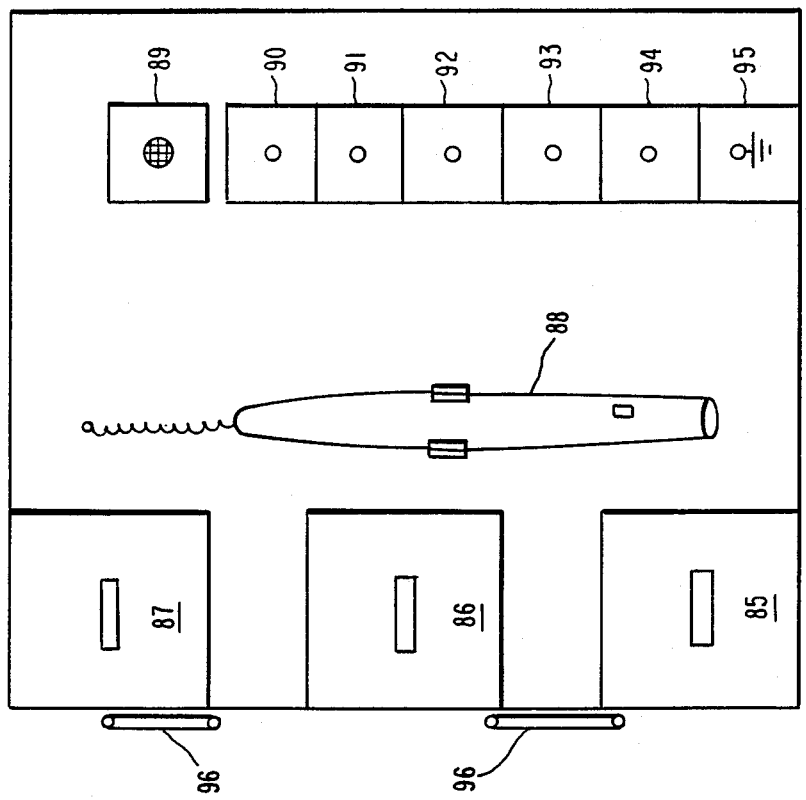
FIG. 9 is an enlarged elevational view of a portion of the interior left side showing part of the entrance door and details of the uppermost instrument panel on that side.

FIG. 9, is an enlarged vertical elevational view of this panel showing the outline of the entrance door (84), a digital thermometer (85), a digital barometer (86), a digital hygrometer (87), a low voltage penlight with coiled power cord (88), a photoelectric cell (89) and a group of color-coded electrical outlets providing 12 volts (90), 9 volts (91), 5 volts (92), 3 volts (93), 1½ volts (94) and electrical ground (95). The panel itself has hinges on the left side (96), so that it can be swung out to face the occupant. The electrical outlets, when used under our guidance in their various possible combinations, will provide power to practically any electronic experiment the child wishes to undertake while the photoelectric cell, which is also available for use in electronic experiments, will cause an electric current to flow through dim lights imbedded in the instrument panel whenever it is lit by the penlight or any strong source of light.

THE AUDIO SYSTEM

Figure 10:
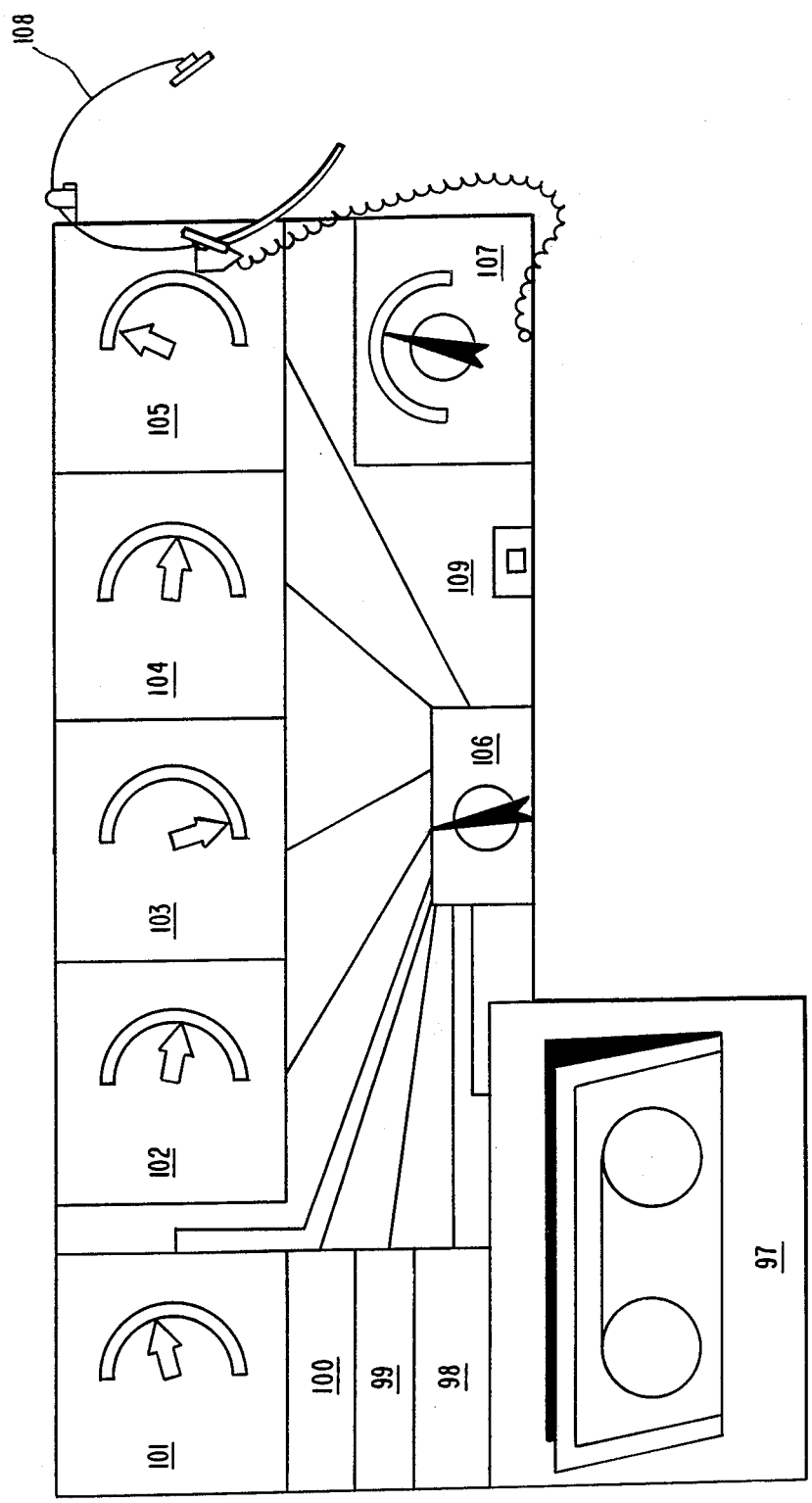
FIG. 10 is an enlarged elevational view of a portion of the interior right side showing details of the uppermost instrument panel on that side.

Referring now to FIG. 7, the Audio System Panel 19 comprises all audio components of the present invention. FIG. 10, is an enlarged elevational view of this panel showing the following:

- an audio cassette player (97), which is intended to play a major part in the invention's role as a tool for unstructured education;
- a telephone extension jack (98), which is available for advanced use of the computer in a telecommunications environment;
- an audio jack (99), which may be connected to an external audio device such as a video cassette recorder or television set so that, in conjunction with the External Vision Apparatus described above, the occupant may receive information from a regular television set without physically leaving the craft;

an intercom jack (100), with one external outlet to provide communications with a person outside the craft, such as a parent or instructor, and optional outlets inside the craft which, in the case of a tandem or side-by-side embodiment, provide communications with the occupant's playmate;

an AM tuner module (101);

an FM tuner module (102);

a 4–12 Mhz short wave tuner module amplifier (103);

a 12–30 Mhz tuner module (104);

a VHF aircraft band tuner module amplifier (105);

a selector switch (106), indicating which of the previous items (97) through (105) is currently connected to the audio frequency amplifier with volume control (107);

a pair of headphones with boom microphone (108); and a "panic button" (109), which causes the speaker in the rear of the craft to emit a squawking noise.

MANNER and PROCESS OF MAKING IT

The physical enclosure of the craft is constructed from five separately molded plastic parts as shown in FIG. 11;

1. The bottom half of the cockpit (110), into which the foot pedals and sliding chair will be installed;

2. The top half of the cockpit (111), which supports the External Vision Apparatus, the exhaust fan control and the fluorescent ceiling lamp, and has molded antennas for supplying signals to the Audio System panel;

3. The access door (112), which has a rectangular cutout for mounting the sliding window;

4. The rear end cap (113), which comprises the power supply and exhaust fan; and 5. The main console frame (114), into which the switch panel, computer monitor or backlighted transparency display unit, instrument panel and computer/keyboard panel are installed, and which also provides support for the full width sliding work/study table.

Figure 12:
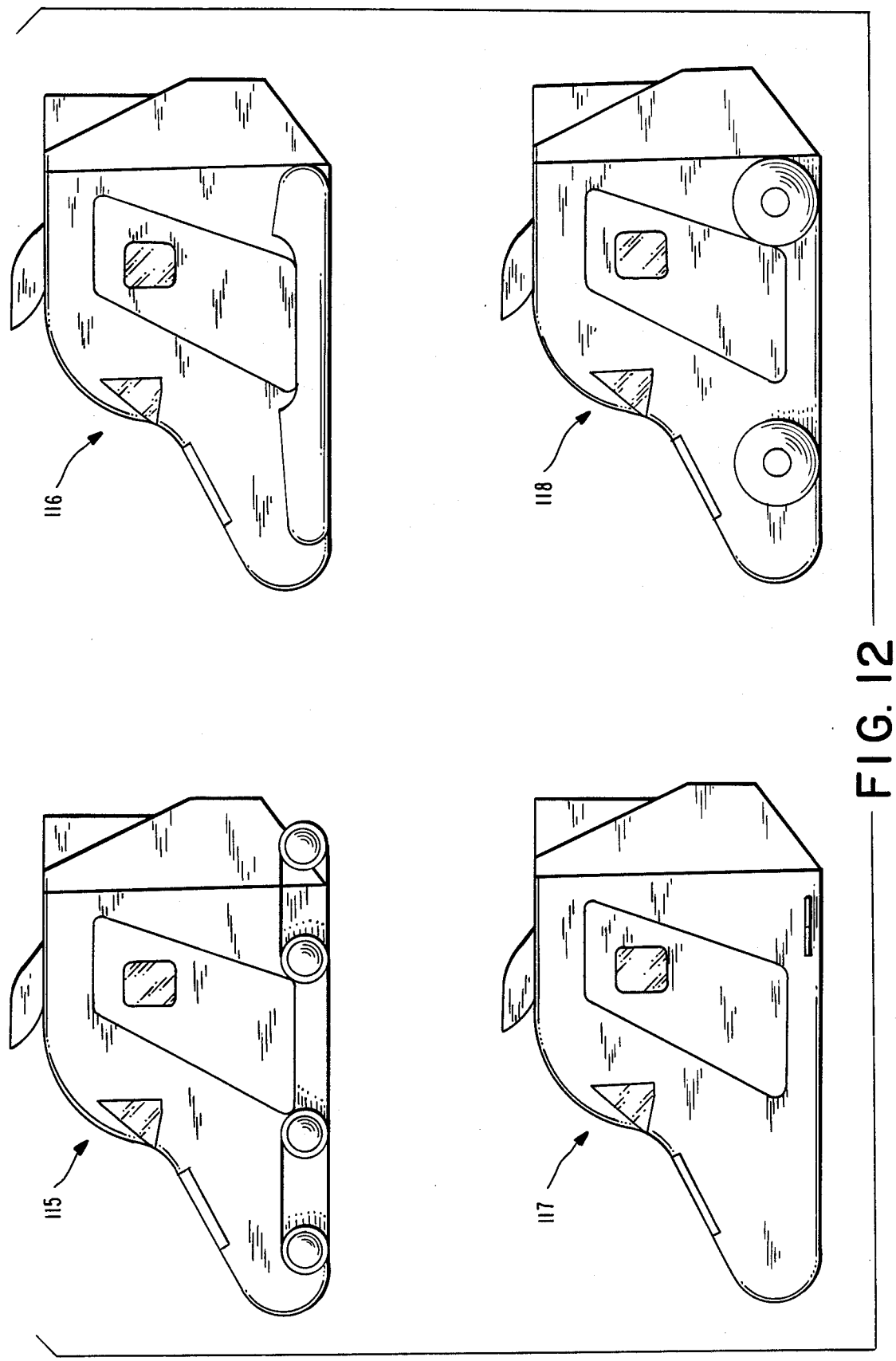
FIG. 12 depicts four (4) external configurations the invention may assume.
Figure 13:
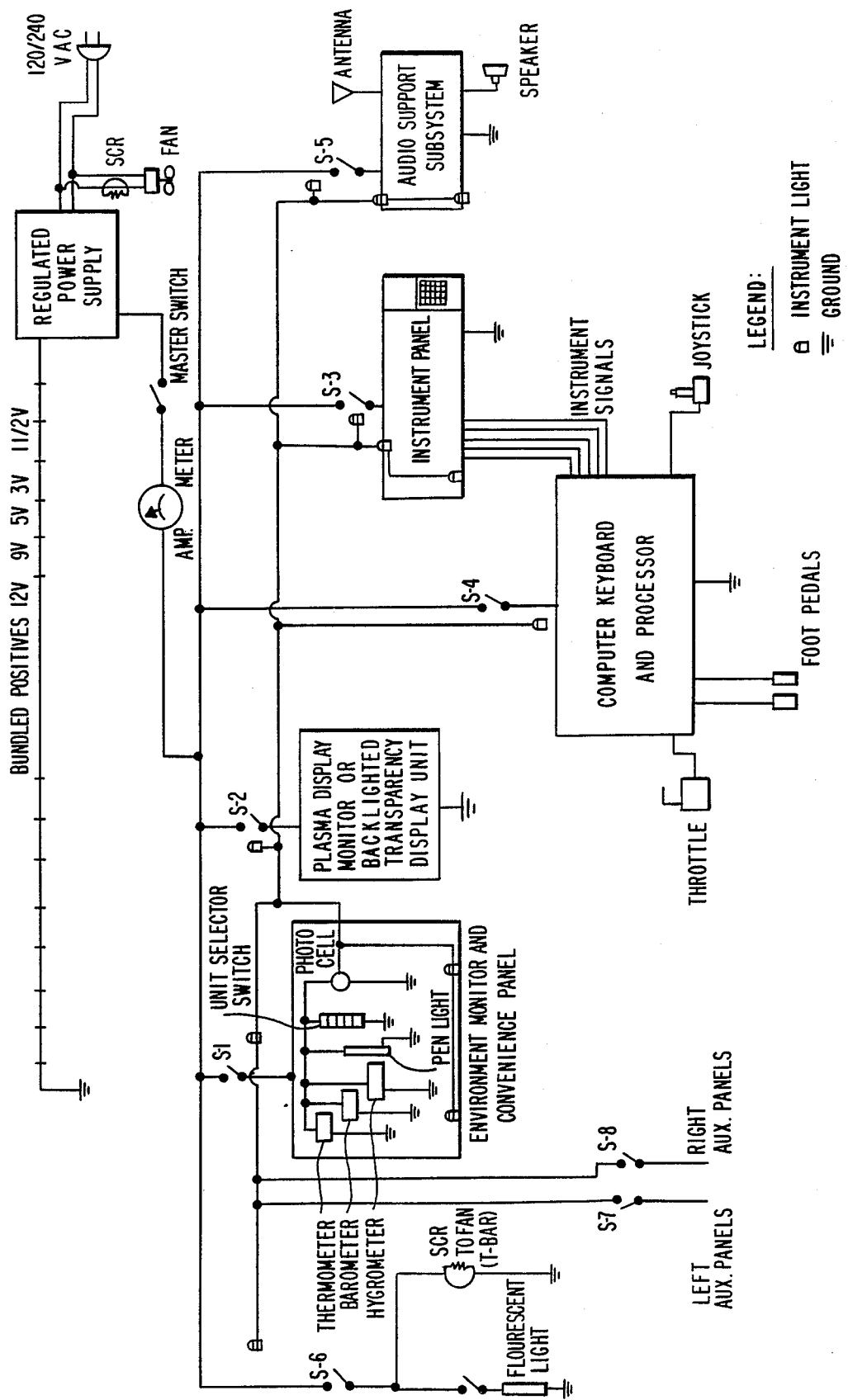
FIG. 13 is a simplified diagram of the electrical/electronic system.

FIG. 12 illustrates how the basic enclosure is fitted with separately molded, non-functional features to increase its resemblance to a particular craft. These are:

a pair of tracks for an all terrain vehicle (115);

a pair of pontoons for a submarine, or hydrofoil (116);

a pair of wings for an air or space craft (117);

a set of tires for a rocket car (118);

FIG. 13 is a simplified diagram of the electrical system: the regulated power supply provides, on the secondary winding, output levels of 12 volts, 9 volts, 5 volts, three volts and 1½ volts which are available through bundled cable connectors at each of the panels. The system is positive grounded and power is controlled through the various rocker switches:

S1 provides power to the Environment Monitoring and Convenience panel. If this switch is closed, the occupant may turn on all instrument lights in the cockpit by beaming light onto the photocell;

S2 provides power to a plasma display monitor or backlighted transparency display unit;

S3 provides power to the instrument panel and digital calculator;

S4 provides power to the computer/keyboard when installed, or to the printed circuit used for the Analog Computer control system;

S5 provides power to the Audio System;

S6 supplies power to the fluorescent lamp in the ceiling of the cockpit and to the control circuit of the Silicon Controlled Rectifier that determines the speed of the exhaust fan;

S7 and S8 are spare switches for the auxiliary panels which will hold optional equipment and support advanced experiments.

There are two ways of controlling the data displayed on the instrument panel—by Analog Computer or by Digital Computer.

Figure 14:
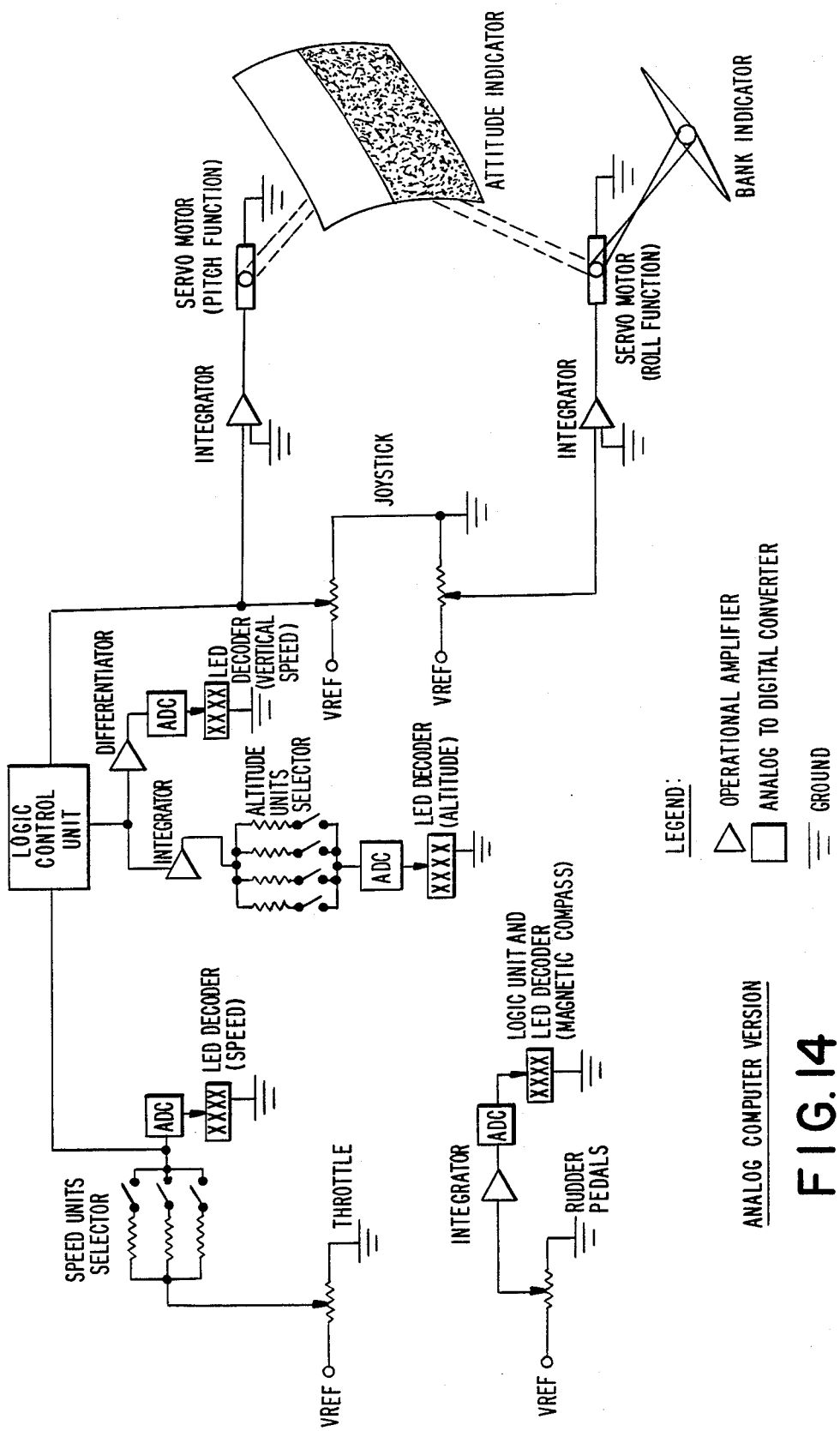
FIG. 14 is a simplified diagram of the Analog Computer Control System.

FIG. 14 is a simplified diagram of the Analog Computer circuit that receives input voltages from the foot pedals rheostat, the joystick rheostats and the throttle rheostat and, by means of scaling resistors and operational amplifiers, produces voltage signals for input to the LED decoders or servomotors. The circuit provides for the display of speed, magnetic heading, altitude, vertical speed, attitude and degree of bank.

FIG. 15 is a simplified diagram of the connections and devices used under digital computer control. Signals from a 1-of-16 decoder, some of which have been modified by scaling circuits, are fed to the appropriate LED decoders or to digital-to-analog converters. Sixteen digital signals are input to generate display data for:

speed magnetic compass/gyro compass pitch attitude roll attitude/bank angle turn speed altitude vertical speed communications radio frequency two navigation radio frequencies two omnidirectional radio headings clock/stop-watch fuel level fuel consumption rate engine speed oil pressure The circuit also provides for 4 switches which would be sensed by the computer to indicate:

gear up/gear down running lights on/off de icers on/off meteor shield on/off

Pushbutton conversion of the displayed values for speed, altitude and rate of climb is achieved by using high-quality scaling resistors to change the level of the current that is input at the corresponding display unit. By choosing the correct resistors, this current level can be made to change by a predetermined factor. Therefore a total input resistance of 100 megohms that changes at the push of a button to 62.15 megohms increases the input current by a factor of 1.609, which changes a reading in miles to a reading in kilometers.

FIG. 16 is a block diagram of the Audio System which, with the exception of the cassette recorder, consists of pluggable, replaceable electronic modules that virtually guarantee upgradeability as new technology becomes available. The basic unit contains:

a cassette player to complement the backlighted transparency display unit;

a jack that is available for external connection to regular telephone service;

a jack for connecting the audio signal of a television or video cassette recorder, which will complement the External Vision Apparatus;

an intercom circuit with external jack for use in the two-seated tandem version of the craft, or for connecting two craft;

an audio frequency amplifier;

a switch to select the source of the input signal; and a beeper circuit/panic button for summoning help.

Pluggable modules comprising a tuner, radio frequency amplifier and demodulator will be available for the AM band, the FM band, short wave bands (1.6-4 mhz, 4-12 mhz, 12-30 mhz) and the VHF aircraft band. These modules will be shape-coded and will only fit in a specific location on the panel so that the correct power, antenna and output signal conductors will be automatically connected when the module is correctly inserted in the panel. The enclosure itself will have tuned antennas molded into the plastic.

We claim:

1. A toy craft intended for both amusement and educational purposes and adapted to assume a plurality of distinctive craft forms, comprising:

a cocoon-like, full enclosure member having an interior and having external attachment means for the reception and detachment of sets of molded features, with each component of each of said sets being of a shape which, when in attachment with said enclosure member, gives the appearance of one of said distinctive craft forms, said enclosure member including a first portion and a second portion and attachment members for releasably securing said first portion to said second portion;

an access door forming a portion of said enclosure member and permitting access between the outside of said enclosure member and said enclosure member interior, a seat within said enclosure member interior and fully adjustable with respect to said enclosure member;

foot control means adjustably secured to the floor of said enclosure member interior;

hand control means adjustably fixed within the interior of said full enclosure member;

an external vision apparatus secured to the top of said enclosure member and having a first end extending into said enclosure member interior and a second end extending away from said enclosure member;

a plurality of attitudinal instruments for providing attitudinal displays, said attitudinal instruments being within said enclosure member interior; and analog computer means interacting with said foot control means, said hand control means and said attitudinal instruments, such that manipulation of said hand and foot control means results in coordinated changes taking place in said attitudinal instruments.

2. A toy craft as recited in claim 1 further comprising a copilot's tandem module releasably attachable to said first portion when said second portion is detached therefrom.

3. A toy craft as recited in claim 1 further comprising an audio system panel releasably secured within said enclosure interior and including an audio system having various audio and video components.

4. A toy craft as recited in claim 3 further comprising console module means attaching said attitudinal instruments and said audio system panel within said enclosure member interior while allowing removal thereof easily without the requirement of tools.

5. A toy craft as recited in claim 1 further comprising a sliding work/study table slidably secured within said enclosure member.

6. A toy craft as recited in claim 1 wherein said external vision apparatus is adjustable with respect to said enclosure member.

7. A toy craft as recited in claim 1 further comprising a convenience panel releasably attached within said enclosure member interior, a phosphorescent penlight connected to said convenience panel, and a photovoltaic cell on said convenience panel, permitting generation of electrical energy for lighting the attitudinal instrument display by shining the penlight on the photovoltaic cell to develop an electric current.

8. A toy craft as recited in claim 1, further comprising a ventilation system having adjustment means for providing a varying amount of air into said enclosure member interior.

9. A toy craft as recited in claim 1 further comprising digital computer means within said enclosure member interior and including a computer keyboard panel, a computer processing unit, a memory and a computer monitor.

10. A toy craft as recited in claim 1 wherein at least one of said plurality of attitudinal displays includes a backlighted transparency display panel.

* * * * *